Patented Sept. 12, 1922.

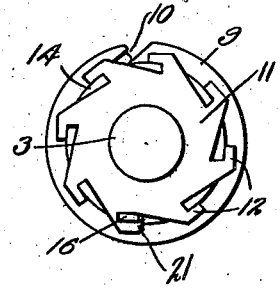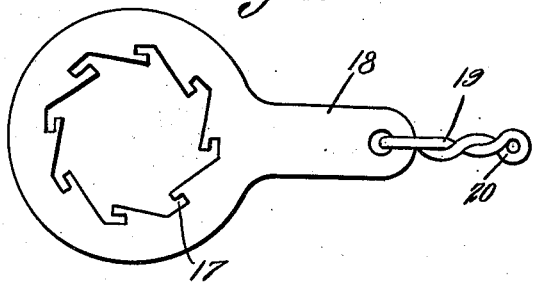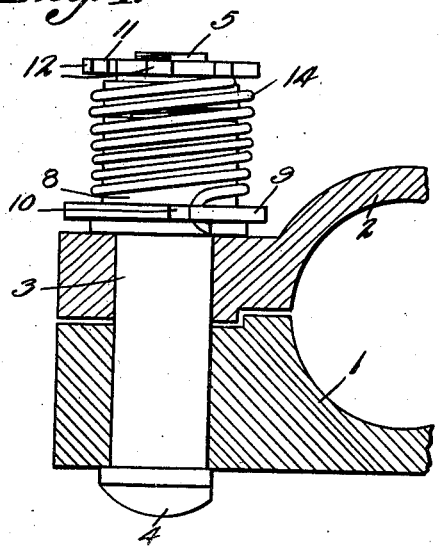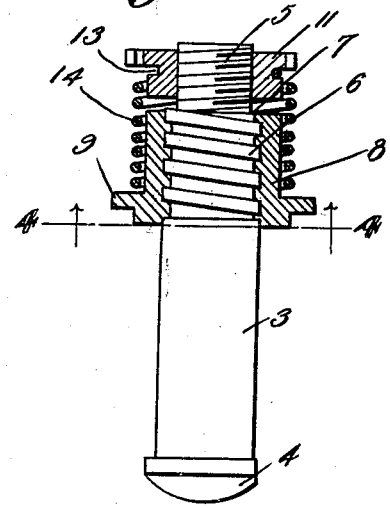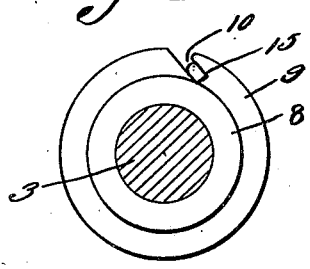

1,428,513

UNITED STATES PATENT OFFICE.

JOHN A. ANDERSON, OF GENESEO, ILLINOIS.

ATTACHMENT FOR BEARINGS.

Application filed September 22, 1921. Serial No. 502,534.

*To all whom it may concern:*

Be it known that I, JOHN A. ANDERSON, a citizen of the United States, residing at Geneseo, in the county of Henry and State of Illinois, have invented a new and useful Attachment for Bearings, of which the following is a specification.

This invention relates to an attachment for bearings whereby wear can be taken up automatically by the automatic actuation of a nut engaging a bolt connecting the parts of the bearing. The invention is designed more particularly as an improvement upon the structure disclosed in my co-pending application No. 409,202, filed Sept. 9, 1920.

It is an object of the invention to simplify and otherwise improve upon the structure and to provide parts which can be assembled readily or be taken apart easily, it being possible to quickly adjust the spring of the device to obtain the desired tension.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a section through a portion of a bearing and showing the present improvements combined therewith.

Figure 2 is a section through the nuts and spring of the attachment, the bolt being shown in elevation.

Figure 3 is a top plan view of the device shown in Figure 1.

Figure 4 is a section on line 4—4, Figure 2.

Figure 5 is a detail view of a wrench adapted to be used with the device.

Referring to the figures by characters of reference 1 and 2 designate portions of a bearing through which a bolt 3 is extended, this bolt being provided at one end with a head 4 while its other end is reduced for a short distance inwardly and provided with screw threads, as shown at 5. Additional screw threads indicated at 6 are provided on the bolt and extend up to the shoulder 7 formed at the inner end of the reduced portion 5, the threads 6 being pitched oppositely to the threads on the reduced portion 5.

A nut 8 is adapted to engage the threads 6 and is provided near one end with an annular flange 9 in which is formed a tangential slot 10.

Another nut 11 engages the threaded reduced portion 5 of the bolt and is provided at one end with an annular series of hooks 12. An annular groove 13 is formed within the nut. A coiled spring 14 surrounds the nut 8 and has a hook 15 at one end which is seated within the slot 10. The other end of the spring is also formed with a hook 16 adapted to engage one of the hooks 12, one end convolution of the spring being seated within the annular groove 13.

From the foregoing it will be apparent that when the nut 11 is screwed tightly against the shoulder 7 and is in engagement with one end of the spring 14, the other end of the spring, by engaging the flange 9 on the nut 8 will tend to rotate said nut so as to move it away from the nut 11, it being understood that the spring 14 is normally under tension while in use. Obviously by shifting the hook 16 from one hook 12 to another the tension of the spring can be increased. Thus as the wear upon the parts of the bearing takes place the nut 8 will be automatically rotated by the spring so as to hold the parts of the bearing together tightly.

If desired a wrench such as shown in Figure 5 may be used for placing the nut 11 in position. This wrench has an opening 17 so shaped and proportioned as to receive the hooks 12 of the nut 11 so as thus to allow the nut to be screwed into or out of position on the bolt. This wrench has an arm 18 extending therefrom and provided with a link 19 in which is formed an eye 20. This eye can be placed in engagement with either of the hooks 16 or 15 for the purpose of increasing the tension of the spring while the parts are being assembled.

It is to be understood that after the hook 16 has been placed in engagement with one of the hooks 12, said hook 12 can be bent inwardly as shown at 21 in Figure 3 thus to prevent the hook 16 from becoming disconnected.

What is claimed is:—

1. In a device of the class described the combination with a bolt having separately threaded portions, the threads on one portion being pitched oppositely to the threads on the other portion, of nuts engaging the respective threaded portions, a coiled spring extending around the nuts and connected at one end to one of the nuts, and means for adjustably connecting the other end of the spring to the other nut.

2. In a device of the class described the combination with a nut having separate threaded portions, the threads on one portion being pitched oppositely to the threads on the other portion, of nuts mounted on the respective portions, an annular series of hooks extending from one of the nuts, and a coiled spring extending around the nuts and connected at one end to one of the nuts and at its other end to one of the hooks on the other nut.

In testimony that I claim the foregoing as my own, I have hereto affixed my signature in the presence of two witnesses.

JOHN A. ANDERSON.

Witnesses:
ELON S. NELSON,
W. R. REHERD.